US007887732B2

(12) United States Patent
Daharsh et al.

(10) Patent No.: US 7,887,732 B2

(45) Date of Patent: Feb. 15, 2011

(54) METHOD OF REDUCING ELECTRICAL DISCHARGE IN A STRUCTURE

(75) Inventors: Ross S. Daharsh, South Milwaukee, WI (US); Mike E. Potter, New Berlin, WI (US); Paul N. Stoving, Oak Creek, WI (US); E. Fred Bestel, West Allis, WI (US)

(73) Assignee: Cooper Technologies Company, Houston, TX (US)

(*) Notice: Subject to any disclaimer, the term of this patent is extended or adjusted under 35 U.S.C. 154(b) by 916 days.

(21) Appl. No.: 11/608,431

(22) Filed: Dec. 8, 2006

(65) Prior Publication Data

US 2007/0091970 A1 Apr. 26, 2007

Related U.S. Application Data

(62) Division of application No. 11/108,856, filed on Apr. 19, 2005, now Pat. No. 7,148,441, which is a division of application No. 10/259,911, filed on Sep. 30, 2002, now Pat. No. 6,888,086.

(51) Int. Cl.
*B29C 39/10* (2006.01)
*B29C 45/14* (2006.01)

(52) U.S. Cl. .................. 264/261; 264/263; 264/272.14; 264/272.15; 264/272.19; 264/275

(58) Field of Classification Search ....................... None
See application file for complete search history.

(56) References Cited

U.S. PATENT DOCUMENTS 3,646,251 A 2/1972 Friedrich
3,791,859 A 2/1974 Hirayama
4,150,270 A * 4/1979 Zunick ....................... 218/138
4,154,993 A 5/1979 Kumbera
4,241,373 A 12/1980 Mara
4,568,804 A 2/1986 Luehring
5,231,249 A 7/1993 Kimura
5,252,913 A 10/1993 Falkowski
5,387,772 A * 2/1995 Bestel ....................... 218/118
5,585,611 A 12/1996 Harvey
5,597,992 A * 1/1997 Walker ....................... 218/121
5,729,888 A 3/1998 Abdelgawad
5,736,705 A * 4/1998 Bestel et al. ................ 218/155
5,747,765 A * 5/1998 Bestel et al. ................ 218/155
5,808,258 A 9/1998 Luzzi
5,917,167 A * 6/1999 Bestel ....................... 218/138
6,338,637 B1 1/2002 Muench
6,410,867 B1 6/2002 Meyer
6,760,206 B2 * 7/2004 Daharsh et al. ............ 361/93.1
6,828,521 B2 * 12/2004 Stoving et al. .............. 218/138
6,897,396 B2 * 5/2005 Ito et al. ..................... 218/120
6,946,614 B2 * 9/2005 McKean et al. ............. 218/154
7,285,743 B2 * 10/2007 Martin ....................... 218/138

* cited by examiner

*Primary Examiner*—Edmund H. Lee
(74) *Attorney, Agent, or Firm*—Fish & Richardson P.C.

(57) ABSTRACT

A current interrupter assembly includes an insulating structure, a current interrupter embedded in the structure, a conductor element embedded in the structure, a current interchange embedded in the structure and connected to create a current path between the current interrupter and the conductor element, and a semiconductive layer covering at least a portion of the conductor element so as to reduce voltage discharge between the conductor element and the structure.

42 Claims, 5 Drawing Sheets

METHOD OF REDUCING ELECTRICAL DISCHARGE IN A STRUCTURE

CROSS-REFERENCE TO RELATED APPLICATIONS

This application is a divisional application of U.S. application Ser. No. 11/108,856, filed Apr. 19, 2005, now U.S. Pat. No. 7,148,441, which is a divisional application of U.S. application Ser. No. 10/259,911, filed Sep. 30, 2002, now U.S. Pat. No. 6,888,086. This application claims priority to the prior applications, and the disclosures of the prior applications are considered part of (and are incorporated by reference in) the disclosure of this application.

TECHNICAL FIELD

This description relates generally to high-power component design and specifically to high power vacuum interrupters.

BACKGROUND

Manufacturers of high-power components in the electric power industry measure the quality of their manufactured components by performing a variety of standard tests. One such test includes measuring the voltage discharge levels (e.g., corona levels) of a component when the component is energized and verifying that the amount of discharge is not excessive for the voltage rating of the component. Excessive corona levels may decrease the lifetime of the component or may be indicative of a problem that may lead to component failure. Another test is the basic impulse insulation level (BIL) design test. The BIL design test measures the ability of the component to handle a high voltage surge that may be comparable, for example, to the surge produced by a lightning strike. A component fails the BIL design test if the voltage surge is able to find a way to ground.

A third test is the power frequency design test. The power frequency design test measures the ability of the component to handle high voltage transients that may be comparable, for example, to the transients produced by the switching of power components. This test is frequently conducted by exposing the component to an elevated AC voltage level typically at 50-60 Hz. A component fails the power frequency test if the elevated voltage transient is able to find a way to ground.

High-power components (e.g., high power-vacuum interrupters) may be subjected to one or more of these tests prior to sale or installation. Failure of these tests may result in an unusable component or a limitation in the use of the component.

SUMMARY

In one general aspect, a current interrupter assembly includes an insulating structure, a current interrupter embedded in the structure, a conductor element embedded in the structure, a current interchange embedded in the structure and connected to create a current path between the current interrupter and the conductor element, and a semiconductive layer that covers at least a portion of the conductor element and reduces the voltage discharges between the conductor element and the structure.

Implementations may include one or more of the following features. For example, the semiconductive layer may be a partially conductive rubber with a resistivity on the order of one ohm-meter. The current interrupter may be a vacuum interrupter. The current interrupter and the current interchange may be encased in a rubberized layer embedded in the structure. The semiconductive layer may be a semiconductive tape or a semiconductive paint and may coat a portion of the conductor element. The semiconductive layer also may be a sleeve that covers that portion of the conductor element. The semiconductive layer may be used to reduce voltage discharges in any void between the conductor element and the structure. The assembly may further include a conductive shield embedded in the structure and configured to decrease voltage discharges in a cavity in the structure. The voltage discharges may be due to high voltage stress caused by physical proximity between one or more high-potential elements including the current interrupter, the current interchange, and the conductor element.

In another general aspect, an electrical switchgear assembly includes an insulating structure, a current interrupter embedded in the structure, a conductor element embedded in the structure, a current interchange embedded in the structure and connected to create a current path between the current interrupter and the conductor element, a low-potential element embedded in the structure, and a semiconductive layer positioned between the conductor element and the structure. The semiconductive layer covers at least a portion of the conductor element and reduces voltage discharges between the conductor element and the structure. A portion of the structure is positioned between the conductor element and the low-potential element.

Implementations may include one or more of the following features. For example, the low-potential element may be a current sensor and may be grounded.

In another general aspect, an electrical assembly includes an insulating structure, a conductive element that is embedded in the structure and that receives a voltage, a low-potential element embedded in the structure, and a semiconductive layer positioned between the conductive element and the structure. The semiconductive layer covers at least a portion of the conductive element and reduces voltage discharges between the conductive element and the structure.

In another general aspect, reducing electrical discharge in a structure that has a conductive element and a low-potential element includes covering a portion of the conductive element with a semiconductive layer, positioning the conductive element and the low-potential element in a mold, filling the mold with a material, and curing the material to produce the structure. The semiconductive layer reduces discharges between the conductive element and the structure.

In another general aspect, a current interrupter assembly includes an insulating structure, a cavity, a current interrupter embedded in the structure, a conductor element embedded in the structure, a current interchange embedded in the structure and used to provide a current path between the current interrupter and the conductor element, and a conductive shield embedded in the structure and positioned in the semiconductive layer. The conductive shield decreases voltage discharges in a cavity in the structure.

Implementations may include one or more of the following features. For example, the current interchange element may include at least a first end and a second end disposed on an axis with the first end electrically connected to the current interrupter, and the conductive shield may extend from the current interchange element past the second end. The conductive shield may be substantially parallel with the axis. The current interchange may have an outer surface disposed between the first end and the second end, and the conductive shield may overlap a portion of the outer surface. The current interchange may have a dimension equal to a distance traveled around a perimeter of an outer surface of the current interchange relative to the axis, and the conductive shield may extend less than the dimension. The current interchange may have one or more sides that form an outer surface disposed between the first end and the second end. The outer surface has a perimeter dimension relative to the axis equal to the distance around the perimeter of the outer surface, and the shield may surround less than the perimeter dimension. The shield may be made from aluminum and may be a mesh. The shield may be made from the same material as the semiconductive layer or may be made from a nonconductive material. The shield may be coated with a semiconductive paint or wrapped in a semiconductive tape. The assembly may further include a semiconductive layer positioned between the conductor element and the structure so as to cover at least a portion of the conductor element and to reduce voltage discharge between the conductor element and the structure.

The current interrupter may be a vacuum interrupter. A vacuum interrupter is an electrical switch in which the medium between the two contact electrodes in the open state is vacuum. This allows the current interrupter to operate at a much higher voltage because it avoids the dielectric breakdown voltage limitation of other mediums. The vacuum interrupter may include a vacuum bottle including the electrode assembly, an operating rod used to mechanically push the electrodes together when the switch is closed, and a current interchange that redirects current as necessary through the interrupter. A high power vacuum interrupter may be coated with an insulation layer such as epoxy through a molding and curing process to encapsulate the interrupter vacuum bottle and the current interchange. The insulation layer mold also may extend beneath the vacuum bottle so as to define an operating rod cavity. The operating rod is subsequently inserted through this cavity and connected to the bottom of the vacuum bottle.

Voids between the insulation layer and high-potential elements such as, for example, the vacuum bottle and the current interchange may arise due to air trapped in the layer during molding or due to layer shrinkage during curing or during the subsequent cooling process. Normally, these voids are not particularly problematic. However, if a grounded element, such as a current sensor, is placed in very close proximity to the energized interrupter assembly, the resulting greater voltage stress may cause dielectric flashovers within these voids that result in the part exhibiting excessive corona levels that may lead to part failure.

Similarly, the operating rod cavity is normally not a source of part failure. However, when a grounded element is placed in close proximity to the energized interrupter assembly and the top of the operating rod cavity, the part's BIL and power frequency performance may substantially decrease due to dielectric flashovers down the operating rod cavity.

Both excessive corona levels and BIL and power frequency performance degradation result upon introduction of a grounded member, such as a current sensor, in very close proximity to the energized interrupter assembly. The above described assemblies and structure prevent or reduce the chance of such failure or reduced BIL and power frequency performance.

Other features will be apparent from the description, the drawings, and the claims.

DESCRIPTION OF DRAWINGS

Like reference symbols in the various drawings indicate like elements.

DETAILED DESCRIPTION

The following description relates generally to high-power component design. Examples of high power components include transformers, generators, fault interrupters, and switchgear assemblies. The switchgear assembly may be used to switch current between different systems that require high power to operate (e.g., electrical distribution systems and high power industrial systems). Although the following description is directed to an example for a switchgear assembly, the described components, elements, techniques, and process may be applied to other high-power components.

Figure 1:
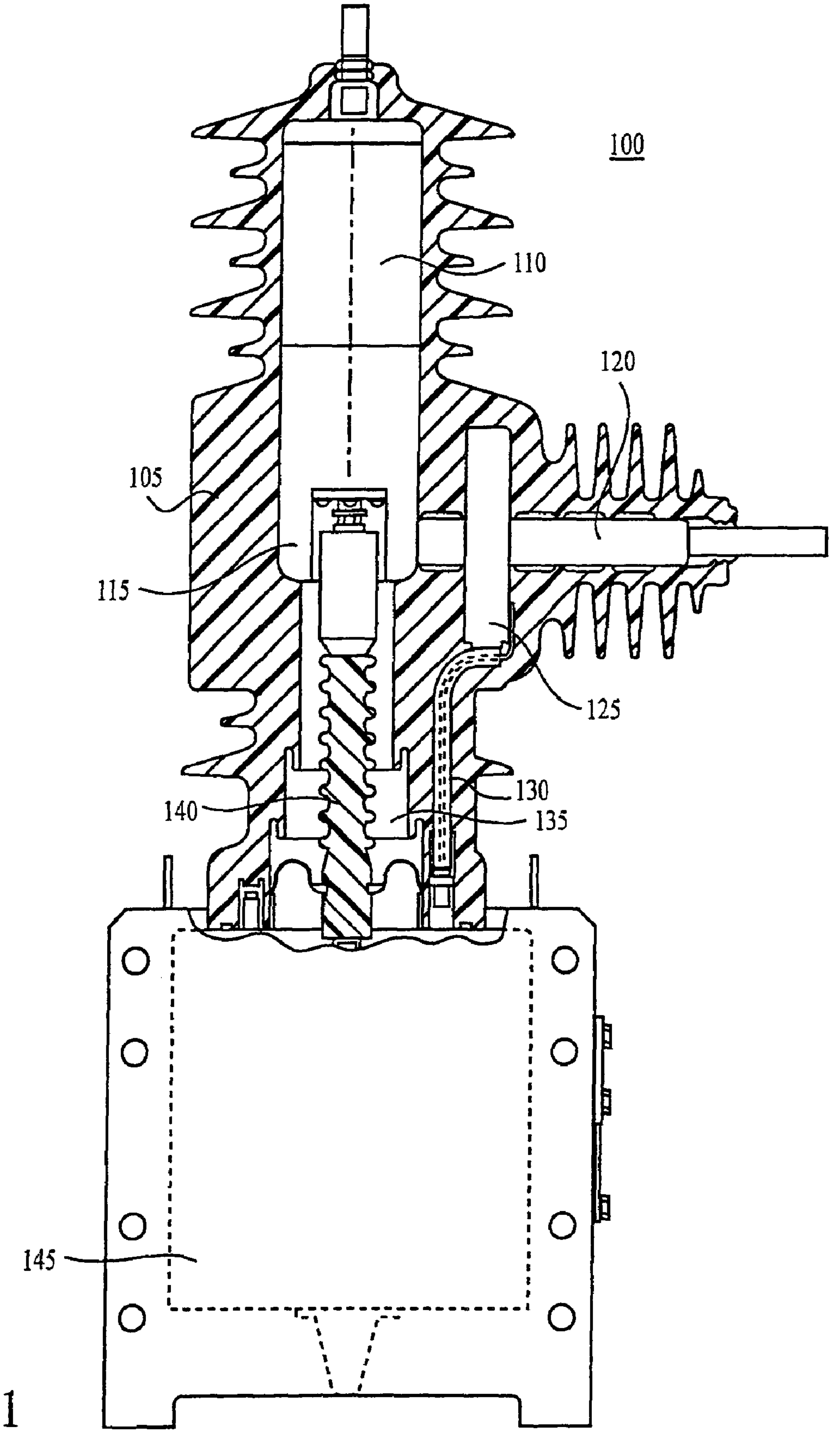
FIG. 1 is an exemplary cross section of an electrical switchgear assembly.

Referring to FIG. 1, an electrical switchgear assembly 100 may include a solid or semi-solid structure 105 that encapsulates a current interrupter 110, a current interchange 115, a conductor element 120, an insulated operating rod 140, and a low-potential element 125. The insulated operating rod 140 may be located inside a cavity 135. The low-potential element 125 may be supported by a support element 130. The structure 105 is mounted on a tank or base 145 that houses additional components. For example, in electrical switchgear 100, the tank 145 typically houses an electro-magnetic actuator mechanism, a latching mechanism, and a motion control circuit.

The structure 105 is manufactured of a solid or semi-solid polymer such as an epoxy or other solid/semi-solid insulating material. For example, the solid dielectric may be made of a cycloaliphatic epoxy component and an anhydride hardener mixed with a silica flour filler. Solid dielectric insulation eliminates or reduces the need for insulating gas or liquid, thereby, for example, greatly reducing switch life-cycle maintenance costs of the assembly 100.

The current interrupter 110 may be a vacuum interrupter. The current interrupter 110 may contain two electrodes, one of which is coupled to the insulated operating rod 140 using the current interchange 115. The insulating operating rod 140 may be partially formed from an insulating material, which may be the same material used for the structure 105. The insulating operating rod 140 moves within the cavity 135. In particular, the insulating operating rod 140 may mechanically move the attached electrode to establish or break contact with a second electrode in the current interrupter and establish or break a current path, respectively.

The current interchange 115 may be coupled at one end to the current interrupter 110 and at the other end to the operating rod 140. The current interchange 115 allows the operating rod to engage one of the electrodes in the current interrupter 110. The current interchange 115 also provides a current path between the current interrupter 110 and the conductor 120. The conductor 120 is electrically coupled to a high-power system (not shown) and provides a current path from the current interchange to the high-power system. The conductor 120 may be a side-arm conductor as shown in FIG. 1. The current interchange 115 may be implemented in a cylindrical housing made of copper. The current interchange 115 and the current interrupter 110 may be coupled together as a unit and encased in a rubberized coating (not shown).

The current interrupter 110, the current interchange 115, and the conductor element 120 are high-potential elements that may, for example, operate at line to ground voltages ranging from 8.9 kV ac rms to 22 kV ac rms. These high-potential elements are required to withstand, for example, alternating current voltages that range from 50 kV to 70 kV ac rms and direct current voltages that range from 110 kV to 150 kV in order for the assembly 100 to pass the power frequency and BIL tests, respectively.

A low-potential element 125 also is encased in the structure 105. In one implementation, the low-potential element 125 may be a current sensor supported by a support element 130. The support element 130 may be made of a metallic rigid tube through which conductors from the current sensor are drawn and connected to appropriate circuitry in the switchgear assembly 100. The support element 130 and the current sensor may be placed at low-potential or grounded. Because the low-potential element 125 is in close physical proximity to the conductor 120, when the electrical switchgear assembly 100 is energized, voltage discharges or dielectric flashovers may occur between the conductor 120 and the structure 105.

Figure 2:
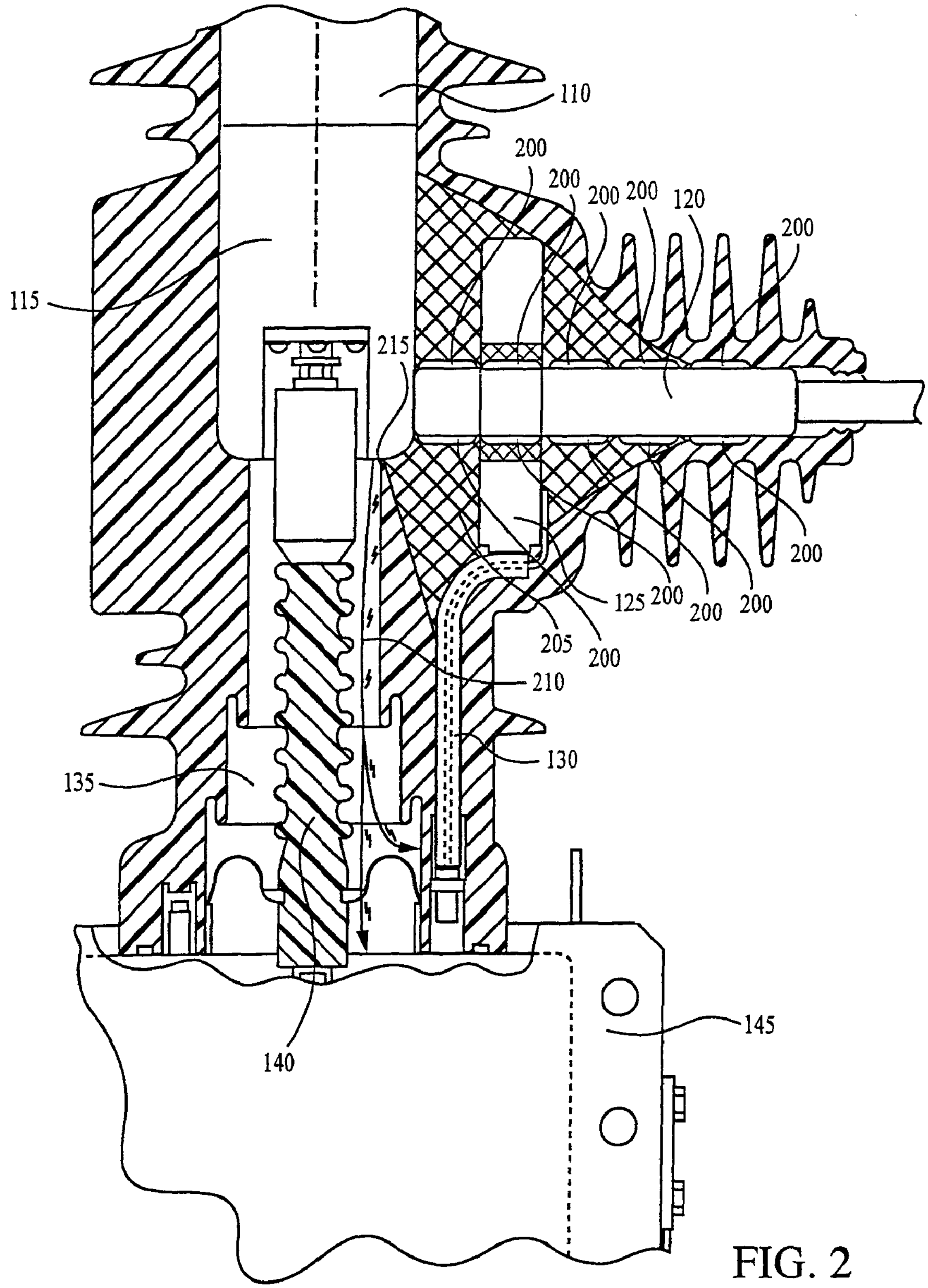
FIG. 2 is a close-up cross-sectional view of the electrical switchgear assembly of FIG. 1.

FIG. 2 shows a close-up view of the electrical switchgear assembly 100 when energized. As shown in FIG. 2, the electrical switchgear assembly 100 may include voids 200 located between the conductor 120 and the structure 105. In one manufacturing process of assembly 100, the current interrupter 110, the current interchange 115, and the conductive element 120 are positioned near the low-potential element 125 in a mold (not shown). The mold is filled with an insulating material and cured to produce the structure 105. The voids 200 may arise when manufacturing the electrical switchgear assembly 100 due to air trapped in the insulating material of the structure 105 during molding. The voids also may result from shrinkage during curing or during the subsequent cooling process.

High-voltage stress areas 205 in the structure 105 are represented as cross-hatched areas in FIG. 2. When the electrical switchgear assembly 100 is energized, the conductor 120 and the current interchange 115 are held at a high-potential. The high-voltage stress areas 205 within the structure 105 result from the potential difference between the high-potential of the conductor 120 and the current interchange 115 and the low-potential of the support element 130 and the low-potential element 125. Because the high-voltage stress areas 205 encompass areas around the voids 200, voltage discharges across the voids 200 between the conductor 120 and the structure 105 may result. The voltage discharges are caused by a dielectric breakdown of the gasses within the voids 200 because of the proximity of the voids to the high voltage stress areas 205. The constant voltage stress and the voltage discharges may slowly weaken the assembly 100 by building up contaminants in the structure 105. Ultimately, treeing may form in the structure 105. Treeing is the formation of conductive carbonized paths in the structure 105 that cause in irreversable, internal degradation of the structure's insulating property. The resulting treeing may eventually cause failure of the switchgear.

When the electrical switchgear assembly 100 is exposed to a high-voltage surge (e.g., during the BIL or power frequency tests), the potential difference between the high-potential of the conductor 120 and the current interchange 115 and the low-potential of the support element 130, the low-potential element 125, and the tank 145 may significantly increase and result in a high voltage stress region 215. This high voltage stress region 215 may cause voltage discharges or dielectric flashovers to travel down the operating rod cavity 135. For example, as shown in FIG. 2, a voltage breakdown along exemplary path 210 may result from the proximity of the extremely high voltage stress in a portion 215 of the structure 105 to the operating rod cavity 135. The high voltage causes the air within the operating rod cavity 135 to break down and thereby creates a lower resistance path 210 from the high-potential elements (i.e., the current interchange 115 and the conductor 120) to the tank 145. A lower resistance path also may be created from the high-potential elements to the low-potential support element 130 (i.e., through a portion of the structure 105 as shown in FIG. 2).

Figure 3:
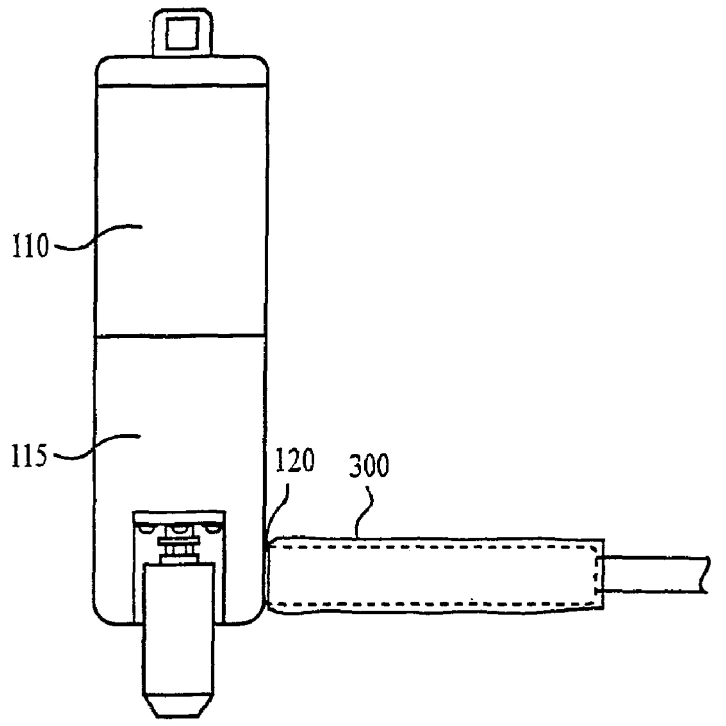
FIG. 3 is an exemplary side view of a current interrupter assembly with a semiconductive layer covering the conductor.

FIG. 3 shows the current interrupter 110, the current interchange 115, the conductor element 120, and a semiconductive layer 300 covering the conductor element 120. The resistivity of the semiconductive layer 300 is greater than that of a conductor (i.e., approx. $1\times10^{-6}$) but less than that of a resistor (i.e., approx. $1\times10^{6}$). The semiconductive layer 300 may be, for example, a semiconductive rubber with a resistivity on the order of 1 ohm-meter. The semiconductive layer 300 adheres to the structure 105 such that any voids created during the molding, curing, and cooling processes lie between the semiconductive layer 300 and the conductor element 120 rather than between the structure 105 and the conductor element 120. This enclosure of the voids in the semiconductive layer reduces or eliminates the number of voltage discharges that occur across the voids between the conductor element 120 and the structure 105. The semiconductive layer further reduces the number of voltage discharges by decreasing the size or number of voids. The semiconductive layer 300 may be implemented using a semiconductive paint or a semiconductive tape that covers all or a portion of the conductor element 120. The semiconductive layer 300 also may be a sleeve that fits over a portion or all of the conductor element 120.

Figure 4:
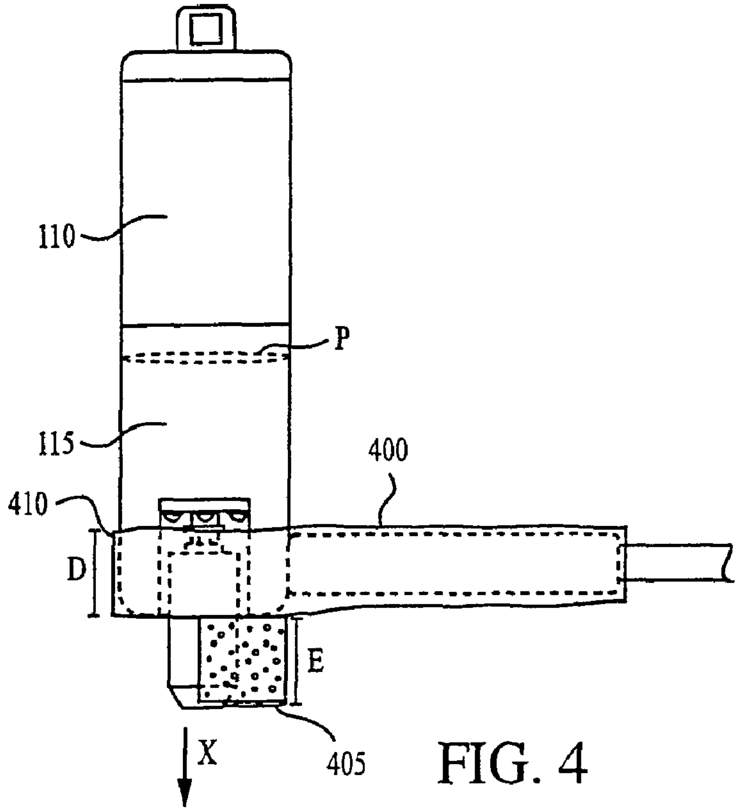
FIG. 4 is a side view of the current interrupter assembly of FIG. 3 with the addition of a conductive shield extending from an end of the current interchange of the assembly.

FIG. 4 shows the current interrupter 110, the current interchange 115, and the conductor element 120. A semiconductive layer 400 covers the conductor element 120 and a portion of the current interchange 115. A conductive shield 405 is partially wrapped around one end of the current interchange 115. The conductive shield 405 is held in place by the semiconductive layer 400. The semiconductive layer 400 may be used to electrically connect the conductive shield to high-potential elements (e.g., the current interchange 115 and the conductor element 120) such that the conductive shield is maintained at the same high-potential.

The semiconductive layer 400 is used to enclose, eliminate, and/or reduce voids 200 between the conductor 120 and the structure 105. As noted, the semiconductive layer 400 also may serve the function of coupling the conductive shield 405 to the current interchange 115. The semiconductive layer 400 may be implemented using a semiconductive paint, a semiconductive tape, or a semiconductive sleeve covering a portion or all of the conductor element 120.

The conductive shield 405 may surround less than the full outer surface perimeter P of one end of the current interchange 115. The conductive shield 405 may be implemented using a mesh shield made from aluminum. The shield may 405 may also be comprised of a semiconductive material (e.g., the same material as the semiconductive layer 400), or the shield 405 may be comprised of a nonconductive or conductive material coated with a semiconductive paint or wrapped in a semiconductive tape. The conductive shield 405 is electrically connected to the current interchange 115 so as to be kept at the same high-potential as the current interchange 115 when the assembly 100 is energized. The conductive shield 405 overlaps a portion D of one of the ends 410 of the current interchange 115 and extends a distance E from the end 410. The conductive shield 405 also may be configured to be substantially parallel to the longitudinal axis X of the current interchange 115. As described below with respect to FIG. 6, the conductive shield 405 decreases the voltage stress near the cavity 135 and thereby decreases the possibility of voltage discharges or dielectric flashovers down the cavity that may cause, for example, the assembly 100 to fail the BIL and power frequency tests. Physical testing and computer analysis techniques known in the art (e.g., finite element analysis, boundary element analysis, and finite difference analysis) may be used to determine the distance E for optimal reduction of voltage stress for any particular implementation.

Figure 5:
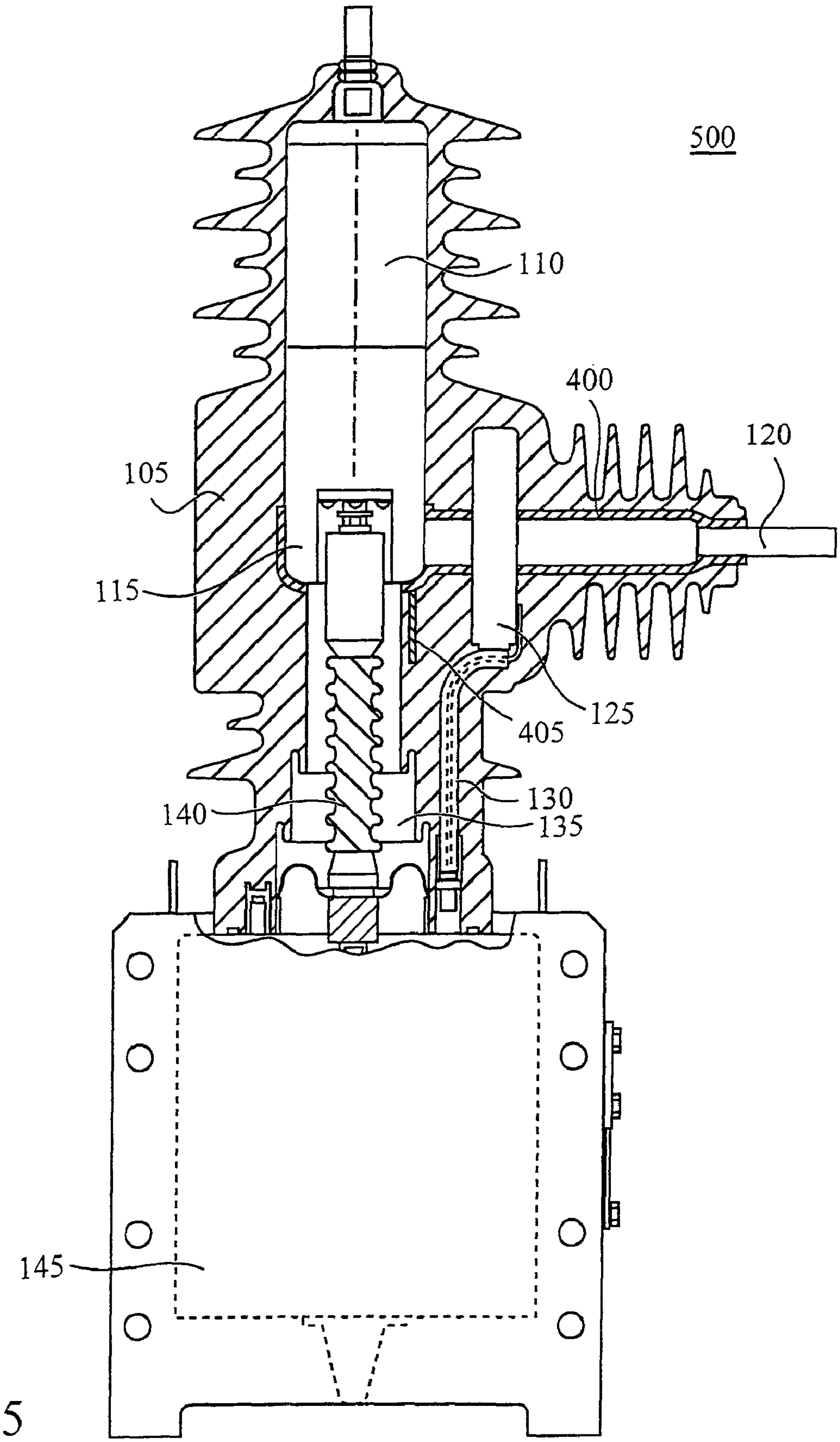
FIG. 5 is a cross section of the electrical switchgear assembly of FIG. 1 with the addition of the semiconductive layer of FIG. 3 and the conductive shield of FIG. 4.

Referring to FIG. 5, an assembly 500 is similar to the assembly 100, however, semiconductive layer 400 and conductive shield 405 have been added. The semiconductive layer 400 helps prevent treeing from forming in the structure 105. In addition, the semiconductive layer 400 helps to prevent the assembly 500 from failing the corona level test by decreasing voltage discharges across voids 200 between the conducting element 120 and the structure 105. In addition, the conductive shield 405 increases the ability of the assembly 500 to pass the BIL and power frequency tests by decreasing voltage discharges down the operating rod cavity 135 during high voltage surges or transients.

Figure 6:
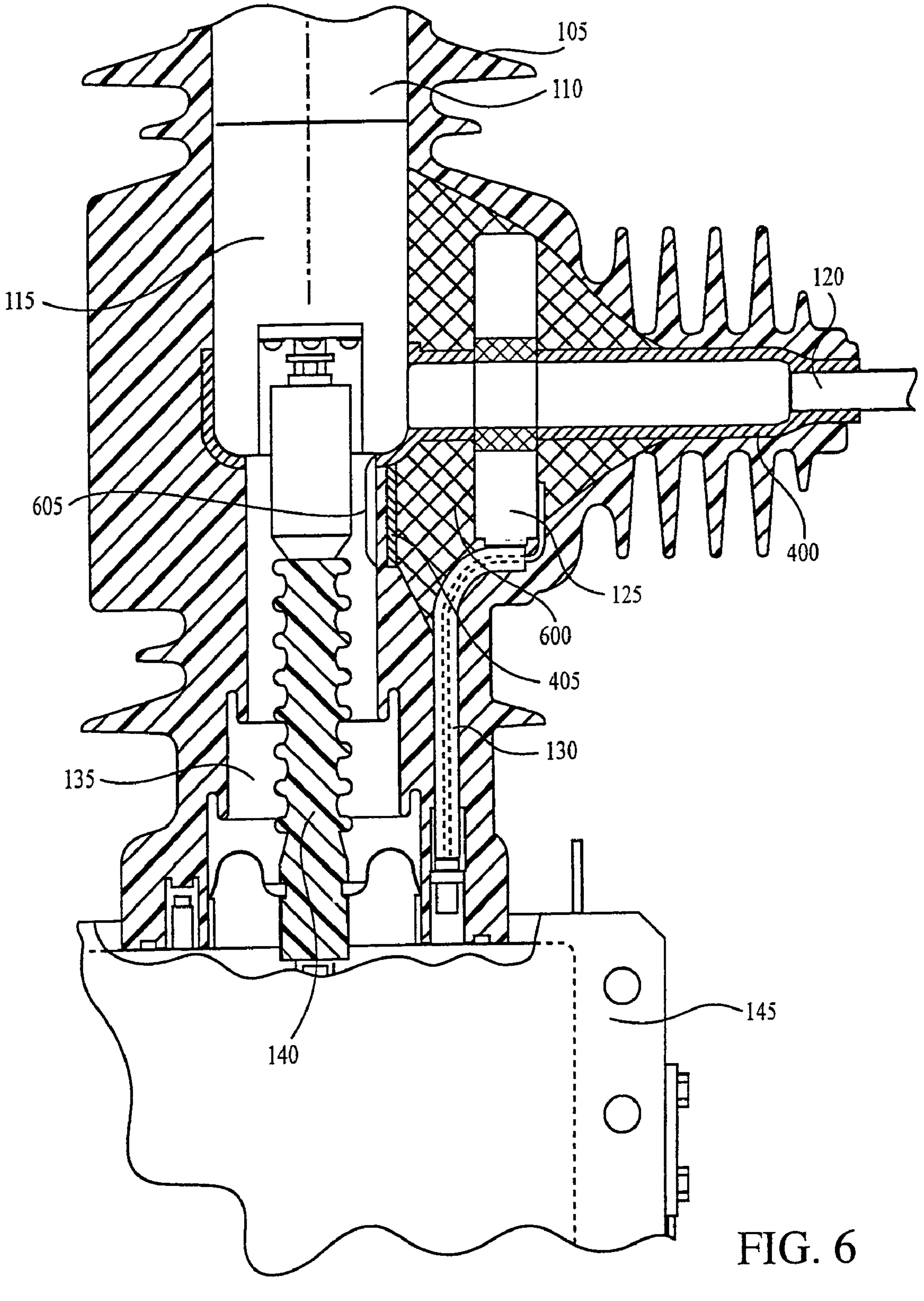
FIG. 6 is a close up cross-sectional view of the electrical switchgear assembly of FIG. 5.

FIG. 6 shows a close-up view of the electrical switchgear assembly 500 when energized. High voltage stress areas 600 in the structure 105 are cross hatched. The effect of the semiconductive layer 400 and the conductive shield 405 may be seen by comparing FIG. 6 to FIG. 2. Specifically, the voids 200 (FIG. 2) have been enclosed, reduced, and/or eliminated and, therefore, discharges are reduced between the conductor element 120 and the structure 105, which means that assembly 500 has lower corona levels than the assembly 100. As a result of the high voltage stress area 215 (FIG. 2) near the operating rod cavity 135, the dielectric voltage of the air in the cavity 135 may have broken down, resulting in possible failure of the BIL and/or power frequency tests due to dielectric flashovers down the cavity 135. The conductive shield 405, however, moves some of the high voltage stress from the air of the cavity 135 into the structure 105, thereby significantly decreasing the possibility of dielectric flashovers down the cavity 135.

Other implementations are within the scope of the following claims:

What is claimed is:

1. A method of reducing electrical discharge in a structure including a conductive element and a low-potential element comprising:

covering a portion of the conductive element with a semiconductive layer configured to reduce discharges between the conductive element and the structure;

positioning the conductive element and the low-potential element in a mold;

filling the mold with a material such that the material contacts at least a portion of the semiconductive layer and the low-potential element; and curing the material to produce the structure.

2. The method of claim 1 wherein covering a portion of the conductive element with a semiconductive layer includes covering a portion of the conductive element with a partially conductive rubber with a resistivity on the order of one ohm-meter.

3. The method of claim 1 wherein covering a portion of the conductive element with a semiconductive layer includes covering a portion of the conductive element with a semiconductive paint.

4. The method of claim 1 wherein covering a portion of the conductive element with a semiconductive layer includes covering a portion of the conductive element with a semiconductive tape.

5. The method of claim 1 wherein covering a portion of the conductive element with a semiconductive layer includes covering a portion of the conductive element with a sleeve.

6. The method of claim 1 wherein covering a portion of the conductive element with a semiconductive layer includes covering a portion of the conductive element with a semiconductive layer configured to reduce discharges in a void between the conductive element and the structure.

7. The method of claim 1 wherein filling the mold with a material includes filling the mold with an insulating material.

8. The method of claim 1 wherein the low-potential element comprises a current sensor.

9. The method of claim 1 further comprising positioning a conductive shield in the semiconductive layer prior to filling the mold with the material, the conductive shield being configured to reduce voltage discharges in a cavity in the structure.

10. The method of claim 1 wherein the structure comprises a molded unitary structure.

11. A method of reducing electrical discharge in a molded unitary structure, the method comprising:

covering at least a portion of a conductive element with a semiconductive layer configured to reduce voltage discharges from the conductive element;

positioning the conductive element and at least a portion of the semiconductive layer in a mold;

positioning a current interrupter in the mold;

positioning a current interchange in the mold, the current interchange being connected to create a current path between the current interrupter and the conductive element;

filling the mold with a material; and curing the material to produce the molded unitary structure such that the conductive element, the portion of the semiconductive layer, and the current interrupter are embedded in the molded unitary structure.

12. The method of claim 11 wherein positioning the conductive element in the mold comprises positioning at least the portion of the conductive element covered by the semiconductive layer in the mold.

13. The method of claim 11 wherein positioning the current interrupter in the mold comprises positioning the entirety of the current interrupter in the mold such that the entirety of the current interrupter is embedded in the molded unitary structure after curing.

14. The method of claim 11 wherein positioning the current interchange in the mold comprises positioning the entirety of the current interchange in the mold such that the entirety of the current interchange is embedded in the molded unitary structure after curing.

15. The method of claim 11 wherein positioning the conductive element and at least a portion of the semiconductive layer in the mold includes positioning the entirety of the semiconductive layer in the mold such that the entirety of the semiconductive layer is embedded in the molded unitary structure after curing.

16. The method of claim 11 wherein the voltage discharges to be reduced are due to high voltage stress caused by proximity between the conductive element and a low-potential element.

17. The method of claim 16 wherein the low-potential element comprises a current sensor.

18. The method of claim 11 further comprising positioning a current sensor in the mold such that the current sensor is embedded in the molded unitary structure after curing.

19. The method of claim 18 wherein positioning the current sensor in the mold comprises positioning the entirety of the current sensor in the mold such that the entirety of the current sensor is embedded in the molded unitary structure after curing.

20. The method of claim 11 wherein covering a portion of the conductive element with a semiconductive layer includes covering a portion of the conductive element with a partially conductive rubber with a resistivity on the order of one ohm-meter.

21. The method of claim 11 wherein covering a portion of the conductive element with a semiconductive layer includes covering a portion of the conductive element with a semiconductive paint.

22. The method of claim 11 wherein covering a portion of the conductive element with a semiconductive layer includes covering a portion of the conductive element with a semiconductive tape.

23. The method of claim 11 wherein covering a portion of the conductive element with a semiconductive layer includes covering a portion of the conductive element with a sleeve.

24. The method of claim 11 wherein covering a portion of the conductive element with a semiconductive layer includes positioning the semiconductive layer to reduce voltage discharges in a void between the conductive element and the molded unitary structure.

25. The method of claim 11 wherein filling the mold with a material includes filling the mold with an insulating material.

26. The method of claim 11 further comprising positioning a conductive shield in the semiconductive layer prior to filling the mold with the material, the conductive shield being configured to reduce voltage discharges in a cavity in the molded unitary structure.

27. The method of claim 26 wherein positioning at least the portion of the semiconductive layer in the mold includes positioning the conductive shield in the mold such that the conductive shield is embedded in the molded unitary structure after curing.

28. The method of claim 27 wherein positioning the conductive shield in the mold includes positioning the entirety of the conductive shield in the mold such that the entirety of the conductive shield is embedded in the molded unitary structure after curing.

29. The method of claim 27 wherein the current interchange includes at least a first end and a second end disposed on an axis, the first end being configured to electrically connect to the current interrupter and positioning the conductive shield in the mold includes positioning such that the conductive shield extends from the current interchange past the second end.

30. The method of claim 29 wherein positioning the conductive shield in the mold includes positioning such that the conductive shield is substantially parallel with the axis.

31. The method of claim 29 wherein the current interchange has an outer surface disposed between the first end and the second end and positioning the conductive shield includes positioning such that the conductive shield overlaps a portion of the outer surface.

32. The method of claim 29 wherein the current interchange has a dimension equal to a distance traveled around a perimeter of an outer surface of the current interchange relative to the axis and positioning the conductive shield includes positioning such that the conductive shield extends less than the dimension.

33. The method of claim 29 wherein the current interchange has one or more sides that form an outer surface that is disposed between the first end and the second end, the outer surface having a perimeter dimension relative to the axis equal to a distance around the perimeter of the outer surface, and positioning the conductive shield includes positioning such that the conductive shield surrounds less than the perimeter dimension.

34. The method of claim 27 wherein the conductive shield comprises an aluminum shield.

35. The method of claim 27 wherein the conductive shield comprises a mesh shield.

36. The method of claim 27 wherein the conductive shield is formed of the same material as the semiconductive layer.

37. The method of claim 27 wherein the conductive shield comprises a conductive or nonconductive material coated with a semiconductive paint.

38. The method of claim 27 wherein the conductive shield comprises a conductive or nonconductive material wrapped in a semiconductive tape.

39. The method of claim 1 wherein the low-potential element is positioned in close proximity to the conductive element, and the proximity is such that the discharges between the conductive element and the structure occur.

40. The method of claim 1 wherein the low-potential element comprises a grounded element.

41. The method of claim 1 wherein an entire surface of the conductive element is covered with the semiconductive layer.

42. The method of claim 9 wherein the conductive shield is formed of the same material as the semiconductive layer.

* * * * *